US006757584B2

(12) United States Patent
Thess et al.

(10) Patent No.: US 6,757,584 B2
(45) Date of Patent: Jun. 29, 2004

(54) DEVICE AND METHOD FOR GENERATING A CLASSIFIER FOR AUTOMATICALLY SORTING OBJECTS

(75) Inventors: Michael Thess, Chemitz (DE); Michael Griebel, Bonn (DE); Jochen Garke, Bonn (DE)

(73) Assignee: prudsys AG, Chemnitz (DE)

( * ) Notice: Subject to any disclaimer, the term of this patent is extended or adjusted under 35 U.S.C. 154(b) by 353 days.

(21) Appl. No.: 09/907,466

(22) Filed: Jul. 17, 2001

(65) Prior Publication Data

US 2002/0128989 A1 Sep. 12, 2002

(30) Foreign Application Priority Data

Jul. 19, 2000 (DE) ........................................ 100 35 099

(51) Int. Cl.[7] .................................................. G06F 7/00

(52) U.S. Cl. ........................ 700/223; 700/224; 700/226

(58) Field of Search ................................ 700/223, 224, 700/225, 226; 209/564, 584, 599, 900

(56) References Cited

U.S. PATENT DOCUMENTS 5,675,710 A * 10/1997 Lewis ......................... 706/12
6,104,835 A * 8/2000 Han ........................... 382/225
6,125,362 A * 9/2000 Elworthy ....................... 707/6
6,240,398 B1 * 5/2001 Allen et al. ................... 700/99

OTHER PUBLICATIONS

Theodoros Evgeniou, Massimiliano Pontil and Tomaso Poggio; Regularization Networks and Support Vector Machines, *Advances in Computational Mathematics*, vol. 13, pp 1–50, 2000.

J. Garcke, M. Griebel and M. Thess; Data Mining With Sparse Grids, No. 675, pp. 1–28, 2000.

Thomas Gerstner and Michael Griebel, Numerical Integration Using Sparse Grids, *Numer. Algorithms*, 18:209–232, 1998.

Federico Girosi, Michael Jones and Tomaso Poggio; Regularization Theory and Neural Networks Architectures, *Neural Computation*, vol. 7 pp 219–265, 1995.

Michael Griebel; A Note on the Complexity of Solving Poisson's Equation for Spaces of Bounded Mixed Derivatives, pp. 1–24.

Michael Griebel, Michael Schneider, and Christoph Zenger; A Combination Technique for the Solution of Sparse Grid Problems, in *Iterative Methods in Linear Algegra*, R. Bequwens, P. de Groen (eds.), pp 263–281, Elsevier, North–Holland, 1992.

Alex J. Smola, Bernhard Schölkopf and Klaus–Robert Muller; The Connection Between Regularization Operators and Support Vector Kernels, *Neural Networks*, vol. 11 pp 637–649, 1998.

Christoph Zenger; Sparse Grids, in Hackbusch, E. (ed.): Parallel Algorithms for Partial Differential Equations, *Notes on Numerical Fluid Mechanics 31*, Vieweg, Braunschweig, 1991.

* cited by examiner

*Primary Examiner*—Gene O. Crawford
(74) *Attorney, Agent, or Firm*—Fenwick & West LLP

(57) ABSTRACT

The invention is in the field of automatic systems for electronic classification of objects which are characterized by electronic attributes. A device and a method for generating a classifier for automatically sorting objects, which are respectively characterized by electronic attributes, are provided, in particular a classifier for automatically sorting manufactured products into up-to-standard products and defective products, having a storage device for storing a set of electronic training data, which comprises a respective electronic attribute set for training objects, and having a processor device for processing the electronic training data, a dimension (d) being determined by the number of attributes in the respective electronic attribute set. The processor device has discretization means for automatically discretizing a function space (V), which is defined over the real numbers ($R^d$), into subspaces ($V_N$, N=2, 3, . . . ) by means of a sparse grid technique and processing the electronic training data with the aid of a processor device.

10 Claims, 6 Drawing Sheets

DEVICE AND METHOD FOR GENERATING A CLASSIFIER FOR AUTOMATICALLY SORTING OBJECTS

The invention is in the field of automatic systems for electronic classification of objects which are characterized by electronic attributes.

Such systems are used, for example, in conjunction with the manufacture of products in large piece numbers. In the course of production of an industrial mass-produced product, sensor means are used for automatically acquiring various electronic data on the properties of the manufactured products in order, for example, to check the observance of specific quality criteria. This can involve, for example, the dimensions, the weight, the temperature or the material composition of the product. The acquired electronic data are to be used to detect defective products automatically, select them and subsequently appraise them manually. The first step in this process is for historical data on manufactured products, for example on the products produced in past manufacturing processes, to be stored electronically in a database. A database accessing means of a computer installation is used to feed the historical data in the course of a classification method to a processor device which uses the historical data to generate automatically characteristic profiles of the two quality classes "Product acceptable" and "Product defective" and to store them in a classifier file. What is termed a classifier is formed automatically in this way with the aid of machine learning.

During the production process for manufacturing the products to be tested and/or classified, the electronic data supplied for each manufactured product by the sensors are evaluated in the online classification mode by an online classification device on the basis of the classifier file or the classifier, and the tested product is automatically assigned to one of the two quality classes. If the class "Product defective" is involved, the appropriate product is selected and sent for manual appraisal.

A substantial problem in the case of the classifiers described by the example is currently to be found in the large number of the acquired historical data. In the course of the comprehensive networking of computer-controlled production installations or other computer installations via the Internet and Intranets, as well as the corporate centralization of electronic data, an explosive growth is currently taking place in the electronic data stocks of companies. Many databases already contain millions and billions of customer and/or product data. The processing of large data stocks is therefore playing an ever greater role in all fields of data processing, not only in conjunction with the production process outlined above. On the one hand, the information, which can be derived automatically from historical data which are present in very large numbers, is "more valuable" with regard to the formation of the classifier, since a large number of historical data are used to generate it automatically, while on the other hand there exists the problem of managing the number of historical data efficiently with regard to the time expended when constructing the classifier.

Known classification methods such as described, for example, in the printed publication U.S. Pat. No. 5,640,492 are based for the most part on decision trees or neural networks. Decision trees admittedly permit automatic classification over large electronic data volumes, but generally exhibit a low quality of classification, since they treat the attributes of the data separately and not in a multivariat fashion.

The best conventional classification methods such as backpropagation networks, radial basis functions or support vector machines can mostly be formulated as regularization networks. Regularization networks minimize an error functional which comprises a weighted sum of an approximation error term and of a smoothing operator. The known machine learning methods execute this minimization over the space of the data points, whose size is a function of the number of the acquired historical data, and are therefore suitable only for historical data records which are small- to medium-sized.

It is usually necessary in this case to solve the following problem of classification and/or regression. M data points exist in a d-dimensional space $x_i$, i=1, . . . , M, $x_i \in R^d$. The data points are assigned function values: $y_i$, i=1, . . . , M, $y_i \in R^d$ (regression) or $y_1 \in \{-1; +1\}$ (classification). The training set is therefore yielded as $S=\{(x_i, y_i) \in R^d x R\}_{i=1}^{M}$. The following regularization problem now needs to be solved:

$$\min R(f)\ f \in V \tag{1}$$

with $$R(f) - \frac{1}{M}\sum_{i=1}^{M} C(f(x_i), y_i) + \lambda \varnothing(f), \tag{2}$$

where

C(x,y) is an error functional, for example $C(x,y)=(x-y)^2$;

$\phi(f)$ is a smoothing operator, $\Phi(f)=\|Pf\|_2^2$, for example $Pf=\nabla f$;

$f$ is a regression/classification function with the required smoothness properties for the operator P; and $\lambda$ is a regularization parameter.

The classification function $f$ usually determined in this case as a weighted sum of ansatz functions $\Phi_i$ over the data points:

$$f_C(x) = \sum_{i=1}^{M} \alpha_i \varphi_i(x). \tag{3}$$

The known approach to a solution leads essentially to two problems: (i) because of the global nature of the ansatz functions $\Phi_i$ and the number of coefficients $\alpha_i$ (equal to the number M of data points), the solution to the regression problem is very time-consuming and sometimes impossible for larger data volumes, since it requires the use of matrices of size M×M; (ii) the application of the classification function $f_c$ to new data records in the course of online classification is very time-consuming, since summing has to be carried out over all functions $\Phi_i$(i=1, . . . , M).

It is the object of the invention to create a possibility to use automatic systems for the electronic classification of objects, which are characterized by electronic attributes, even for applications in which a very large number of data points are present.

The object is achieved according to the invention by means of the independent claims.

An essential idea which is covered by the invention consists in the application of the sparse grid technique. For this purpose, the function $f$ not generated in accordance with the formulation of (3) but a discretization of the space V is undertaken, $V_N \in V$ being a finitely dimensioned subspace of V, and N being a dimension of the subspace $V_N$. The function $f$ is determined as $$f_N(x) = \sum_{i=1}^{N} \alpha_i \varphi_i(x). \tag{4}$$

The regularization problem in the space $V_N$ determining $f_N$ is then:

$$R(f_N) = \frac{1}{M}\sum_{i=1}^{M}(f_N(x_i) - y_i)^2 + \lambda \|Pf_N\|_{L_2}^2, \tag{5}$$

with $C(x, y) = (x - y)^2$ and $\phi(f) = \|Pf\|_2^2$.

By contrast with conventional methods, the sparse grid space is selected as subspace $V_N$. This avoids the problems of the prior art. The number N of the coefficients $\alpha_i$ to be determined depends only on the discretization of the space V. The effort on the solution of (5) scales linearly with the number M of data points. Consequently, the method can be applied for data volumes of virtually any desired size. The classification function $f_N$ is built up only from N ansatz functions and can therefore be evaluated quickly in the application.

The essential advantage which the invention provides by comparison with the prior art consists in that the outlay for generating the classifier scales only linearly with the number of data points, and thus the classifier can be generated for electronic data volumes of virtually any desired size. A further advantage consists in the higher speed of application of the classifier to new data records, that is to say in the quick online classification.

The sparse grid classification method can also be used to evaluate customer, financial and corporate data.

Advantageous developments of the invention are disclosed in the dependent subclaims.

The invention is explained in more detail below with the aid of exemplary embodiments and with reference to a drawing, in which.

Figure 1:
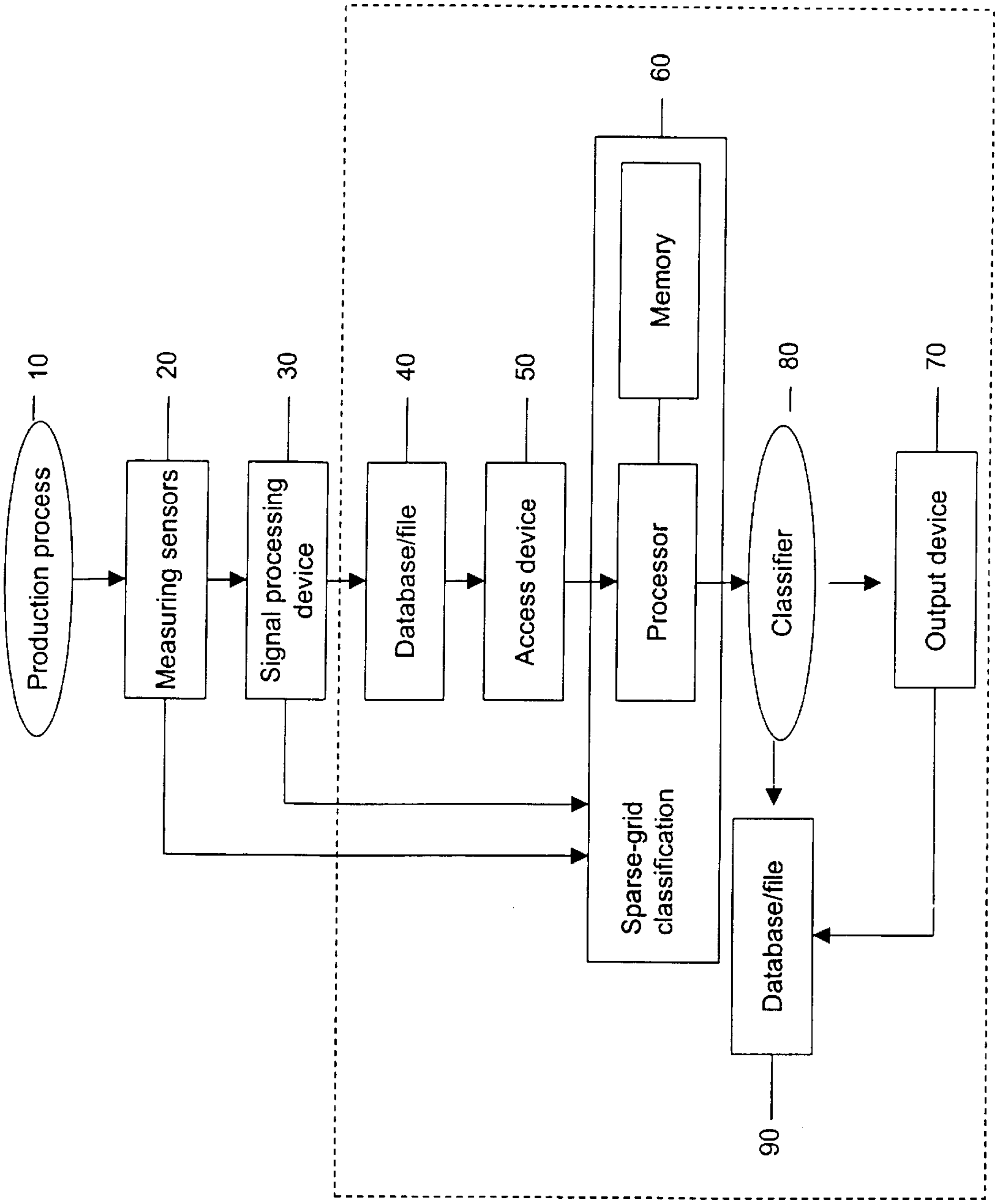
FIG. 1 shows a schematic block diagram of a device for automatically generating a classifier and/or for online classification.

The sparse grid classification method is described in detail below.

Consideration is given firstly in this case to an arbitrary discretization $V_N$ of the function space V, which leads to the regularization problem (5). Substituting the ansatz function (4) in the regularization formulation (5) yields $$R(f_N) = \frac{1}{M}\sum_{i=1}^{M}\left(\sum_{j=1}^{N}\alpha_j\varphi_j(x_i) - y_i\right)^2 + \lambda\sum_{i=1}^{N}\sum_{j=1}^{N}\alpha_i\alpha_j(P\varphi_i, P\varphi_j)_{L2}. \tag{6}$$

Differentiation with respect to $\alpha_k$, k=1, . . . , N yields $$0 = \frac{\partial R(f_N)}{\partial \alpha_k} = \frac{2}{M}\sum_{i=1}^{M}\left(\sum_{j=1}^{N}\alpha_j\varphi_j(x_i) - y_i\right)\cdot\varphi_k(x_i) + 2\lambda\sum_{j=1}^{N}\alpha_j(P\varphi_j, P\varphi_k)_{L2}. \tag{7}$$

This is equivalent to (k=1, . . . , N)

$$\sum_{j=1}^{N}\alpha_j\left[M\lambda(P\varphi_j, P\varphi_k)_{L2} + \sum_{i=1}^{M}\varphi_j(x_i)\cdot\varphi_k(x_i)\right] = \sum_{i=1}^{M} y_i\varphi_k(x_i). \tag{8}$$

This corresponds in matrix notation to the linear system $$(\lambda C + B\cdot B^T)\alpha = By. \tag{9}$$

Here, C is a square N×N matrix with entries $C_{j,k}=M\cdot(P\Phi_j, P\Phi_k)_{L2}$, j,k=1, . . . N, and B is a rectangular N×M matrix with entries $B_{i,j}=\Phi_j(x_i)$, i=1, . . . M, j=1, . . . , N. The vector y contains the data $y_i$ and has the length M. The unknown vector $\alpha$ contains the degrees of freedom $\alpha_j$ and has the length N.

Various minimization problems in d-dimensional space occur depending on the regularization operator. If, for example, the gradient $P=\nabla$ is used in the regularization expression in (2), the result is a Poisson problem with an additional term which corresponds to the interpolation problem. The natural boundary conditions for such a differential equation in, for example, $\Omega=[0,1]^d$ are Neumann conditions. The discretization (4) now yields the system (9) of linear equations, C corresponding to a discrete Laplace matrix. The system must now be solved in order to obtain the classifier $f_N$.

The representation so far has not been specific as to which finite dimensional subspace $V_N$ and which type of basis functions are to be used. By contrast with conventional data mining approaches, which operate with ansatz functions which are assigned to data points, use is now made of a specific grid in feature space in order to determine the classifier with the aid of these grid points. This is similar to the numerical treatment of partial differential equations. For reasons of simplicity, the further description will be restricted to the case of $x_i\in\Omega=[0,1]^d$. This situation can always be achieved by a suitable rescaling of the data space. A conventional finite element discretization would now employ an equidistant grid $\Omega_n$ with a grid width $h_n=2^{-n}$ in each coordinate direction, n being the refinement level. In the following the gradient $P=\nabla$ is used in the regularization expression in (2). Let j be the multi index $(j_1, \ldots, j_d)\in N^d$. A finite element method with piecewise d-linear ansatz and test functions $\phi_{n,j}(x)$ on the grid $\Omega_n$ would now yield $$(f_N(x) =)f_n(x) = \sum_{j_1=0}^{2^n}\cdots\sum_{j_d=0}^{2^n}\alpha_{n,j}\phi_{n,j}(x)$$

and the variational formulation (6)–(9) would lead to the discrete system of equations $$(\lambda C_n + B_n\cdot B_n^T)\alpha_n = B_n y \tag{10}$$

of size $(2^n+1)^d$ and with matrix entries in accordance with (9). It may be pointed out that $f_n$ lives in the space $$V_n := \text{span}\{\phi_{n,j},\ j_t=0, \ldots, 2^n, t=1, \ldots, d\}.$$

The discrete problem (10) could be treated in principle by means of a suitable solver such as the conjugate gradient method, a multigrid method or another efficient iteration method. However, this direct application of a finite element discretization and of a suitable linear solver to the existing system of equations is not possible for d-dimensional problems if d is greater than 4.

The number of grid points would be of the order of $O(h_n^{-d})=O(2^{nd})$ and, in the best case, when an effective technique such as the multigrid method is used, the number of operations is of the same order of magnitude. The "curse" of dimensionality is to be seen here: the complexity of the problem grows exponentially with d. At least for d>4 and a sensible value of n, the system of linear equations that is produced can no longer be stored and solved on the largest current parallel computers.

In order to reduce the "curse" of dimension, the approach is therefore to use a sparse grid formulation: Let $l=(l_1, \ldots, l_d)\in N^d$ be a multiindex. The problem is discretized and solved on a certain sequence of grids $\Omega_l$ with a uniform grid width $h_t=2^{-l_t}$ in the t-th coordinate direction. These grids can have different grid widths for different coordinate directions. Consideration will be given in this regard to $\Omega_l$ with $$l_1+\ldots+l_d=n+(d-1)-q,\ q=0, \ldots, d-1,\ l_t>0. \tag{11}$$

Let us define L as $$L := \sum_{q=0}^{d-1} \sum_{l_1+\ldots+l_d=n+(d-1)-q} 1.$$

The finite element approach with piecewise d-liner test functions $$\phi_{l,j}(x) := \prod_{t=1}^{d} \phi_{l_t,j_t}(x_t) \tag{12}$$

yields $$f_l(x) = \sum_{j_1=0}^{2^{l_1}} \cdots \sum_{j_d=0}^{2^{l_d}} \alpha_{l,j}\varphi_{l,j}(x)$$

on the grid $\Omega_l$, and the variation formulation (6)–(9) results in the discrete system of equations $$(\lambda C_l+B_l\cdot B_l^T)\alpha_l=B_l y \tag{13}$$

with the matrices $(C_l)_{j,k}=M\cdot(\nabla\phi_{l,j},\nabla\phi_{l,k})$ and $(B_l)_{j,i}=\Omega_{l,j}(x_i)$, $j_t, k_t=0, \ldots, 2^{l_t}$, t=1, . . . , d, i=1, . . . , M and the unknown vector $(\alpha_l)_j$, $j_t=0, \ldots, 2^{l_t}$, t=1, . . . , d. These problems are then solved using a suitable method. The conjugate gradient method is used for this purpose together with a diagonal preconditioner. However, it is also possible to apply a suitable multigrid method with partial semi-coarsening. The discrete solutions $f_l$ are contained in the space $$V_l:=\text{span}\{\Phi_{l,j}, j_t=0, \ldots, 2^{l_t}, t=1, \ldots, d \tag{14}$$

of the piecewise d-linear functions on the grid $\Omega_l$.

It may be pointed out that, by comparison with (10), all these problems are now substantially reduced in size. Instead of a problem of size $\dim(V_n)=O(h_n^{-d})=O(2^{nd})$ we need to treat $O(dn^{d-1})$ problems of size $\dim(V_l)=O(h_n^{-1})=O(2^n)$ $\dim(V_l)=0(h_n^{-l})=0(2^n)$. Furthermore, these problems can be solved independently of one another, and this permits a simple parallelization (compare M. Griebel, THE COMBINATION TECHNIQUE FOR THE SPARSE GRID SOLUTION OF PDES ON MULTIPROCESSOR MACHINES, Parallel Processing Letters, 2, 1992, pages 61–70).

Finally, the results $f_l(x)=\Sigma_j\alpha_{l,j}\phi_{l,j}(x)\in V_l$ of the different grids $\Omega_l$ can be combined as follows:

$$f_n^{(c)}(x) := \sum_{q=0}^{d-1} (-1)^q \binom{d-1}{q} \sum_{l_1+\ldots+l_d=n+(d-1)-q} f_l(x). \tag{15}$$

The resulting function $f_n^{(c)}$ lives in the sparse-grid space $$V_n^{(s)} := \bigcup_{\substack{l_1+\ldots+l_d=n+(d-1)-q \\ q=0,\ldots,d-1,l_t>0}} V_l.$$

Figure 4A:
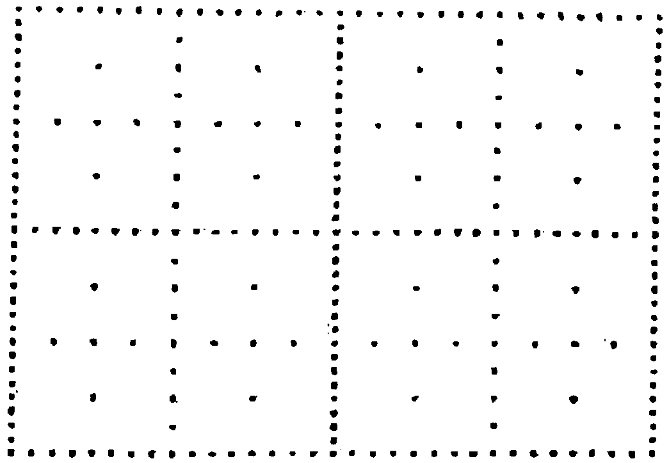
FIGS. 4A and 4B show an illustration of a two-dimensional and, respectively, a three-dimensional sparse grid (level n=5)
Figure 4B:
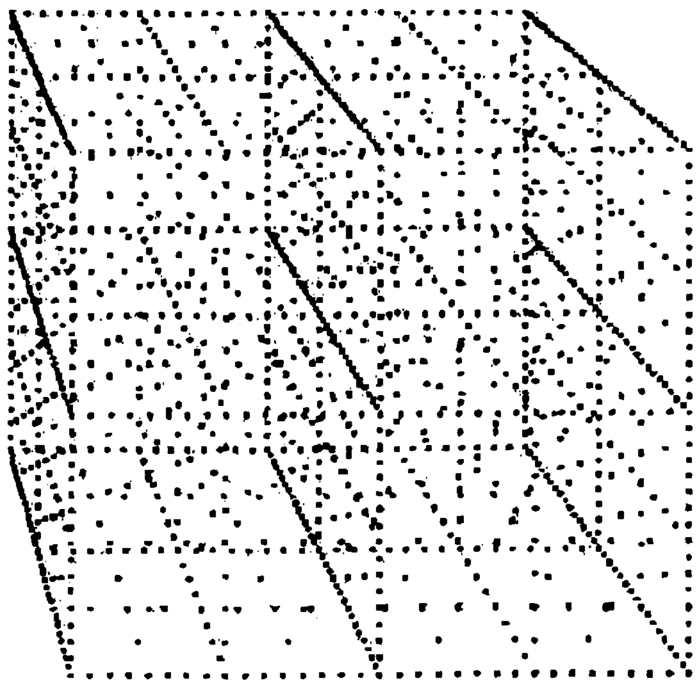
Figure 5:
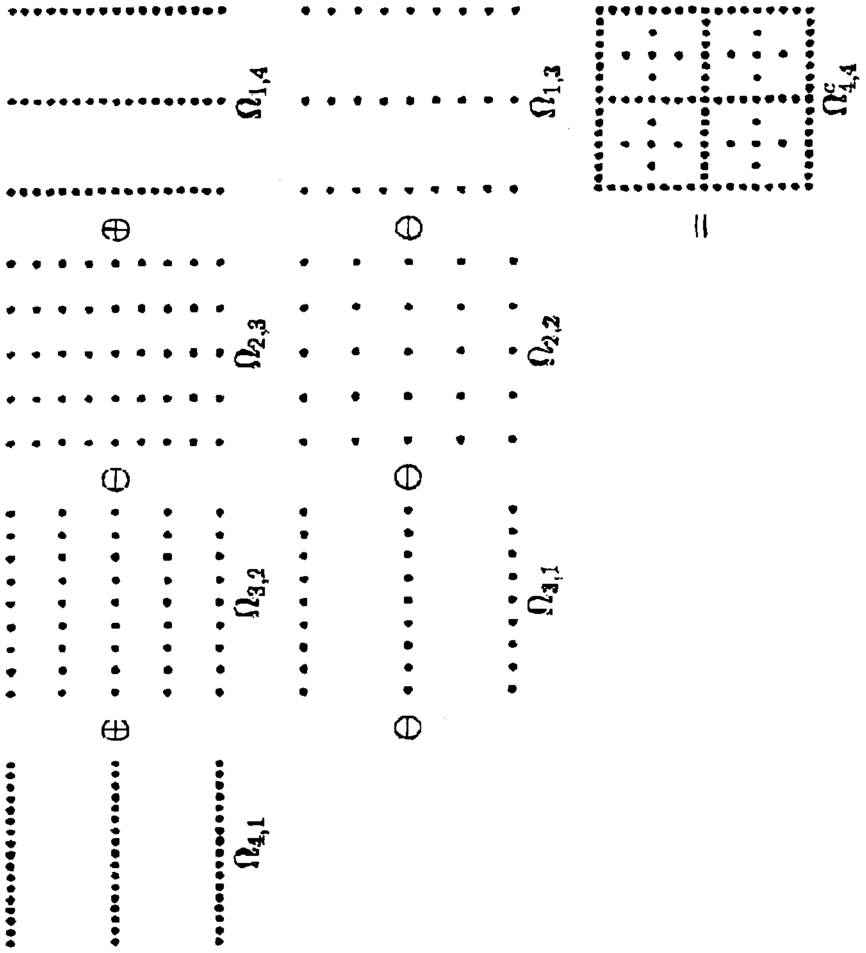
FIG. 5 shows the combination technique for level 4 in 2 dimensions.

The sparse-grid space has a dimension $\dim(V_n^{(s)})=O(h_n^{-l}(\log(h_n^{-l}))^{d-l})$. It is defined by a piecewise d-linear hierarchical tensor product basis (compare H. -J. BUNGARTZ, D ÜNNE GITTER UND DEREN ANWENDUNG BEI DER ADAPTIVEN LÖSUNG DER DREIDIMENSIONALEN POISSON-GLEICHUNG [Sparse grids and their application in the adaptive solution of the three-dimensional Poisson equation], Dissertation, Institut für Informatik, Technical University Munich, 1992). A sparse grid is illustrated in FIGS. 4A and 4B (level 5), respectively, for the two-dimensional and three-dimensional cases. FIG. 5 shows the grids which are required in the combination formula of level 4 in the two-dimensional case. It is also shown in FIG. 5 how the superimposition of the points in the sequence of the grids of the combination technique supplies a sparse grid of the corresponding level n.

It may be pointed out that the sum over the discrete functions from different spaces $V_l$ in (15) requires the d-linear interpolation which precisely corresponds to the transformation to the representation on the hierarchical basis. Details are described in the following document: M. Griebel, M. Schneider, C. Zenger, A COMBINATION TECHNIQUE FOR THE SOLUTION OF SPARSE GRID PROBLEMS, Iterative Methods in Linear Algebra, P. de Groen and R. Beauwens, eds., IMACS, Elsevier, North Holland, 1992, pages 263–281. In the case illustrated, however, the function $f_n^{(c)}$ is never set up explicitly. Instead of this, the solutions $f_l$ are held on the different grids $\Omega_l$ which occur in the combination formula. Each linear operator F over $f_n^{(c)}$ can now easily be expressed with the aid of the combination formula (15), the operation of F is being performed directly on the functions $f_n$, that is to say $$F(f_n^{(c)}) = \sum_{q=0}^{d-1} (-1)^q \binom{d-1}{q} \sum_{l_1+\ldots+l_d=n+(d-1)-q} F(f_l). \tag{16}$$

If it is now required to evaluate a newly specified set of data points $\{\tilde{x}_i\}_{i=1}^{\tilde{M}}$ (the test or evaluation data) with $$\tilde{y}_i:=f_n^{(c)}(\tilde{x}_i), i=1, \ldots, \tilde{M}$$

all that is required is to form the combination of the associated values for $f_l$ in accordance with (15). The evaluation of the various $f_l$ at the test points can be performed in the completely parallel fashion, and that summation essentially requires an all-reduce operation. It has been proved for elliptical partial differential equations of second order that the combination solution $f_n^{(c)}$ is nearly as accurate as the fall grid solution $f_n$, that is to say the discretization error satisfies $$\|e_n^{(c)}\|_{L_P}:=\|f-f_n^{(c)}\|_{L_P}=O(h_n^2 \log (h_n^{-1})^{d-1})$$

assuming a slightly stronger smoothness requirement on $f$ by comparison with the full grid approach. The seminorm $$|f|_\infty := \left\| \frac{\partial^{2d} f}{\prod_{j=1}^{d} \partial x_j^2} \right\|_\infty \tag{17}$$

is required to be bounded. A series expansion of the error is also required. Its existence is known for PDE model problems (compare H. -J. Bungartz, M. Griebel, D. Röschke, C. Zenger, POINTWISE CONVERGENCE OF THE COMBINATION TECHNIQUE FOR THE LAPLACE EQUATION, East-West J. Numer. Math., 2, 1994, pages 21–45).

The combination technique is only one of various methods for solving problems on sparse grids. It may be pointed out that Galerkin, finite element, finite difference, finite volume and collocation approaches also exist, these operate directly with the hierarchical product basis on the sparse grid. However, the combination technique is conceptually simpler and easier to implement. Furthermore, it permits the reuse of standard solvers for its various subproblems, and can be parallelized in a simple way.

So far, only d-linear basis functions based on a tensor product approach have been mentioned (compare J. Garcke, M. Griebel, M. Thess, DATA MINING WITH SPARSE GRIDS, SFB 256 Preprint 675, Institute for Applied Mathematcis, Bonn University, 2000). However, linear basis functions based on simplicial decompositions are also possible for the grids of the combination technique: Use is made for this purpose of what is termed Kuhn's triangulation (compare H. W. Kuhn, SOME COMBINATORIAL LEMMAS IN TOPOLOGY, IBM j. Res. Develop., 1960, pages 518–524). This case has been described in J. Garcke and M. Griebel, DATA MINING WITH SPARSE GRIDS USING SIMPLICIAL BASIS FUNCTIONS, KDD 2001 (accepted), 2001.

It is also possible to use other ansatz functions, for example functions of higher order or wavelets, as basis functions. Moreover, it is also possible to use both other regularization operators P and other cost functions C.

The use of the method is described below with reference to an example of quality assurance in the industrial sector.

In the course of the production of an industrial mass-produced item, various data on the product are acquired automatically by sensors. Their aim is to use these data to select effective products automatically and appraise them manually. Acquired datalattributes can be, for example: dimensions of the product, weight, temperature, and/or material composition.

Each product is characterized by a plurality of attributes and therefore corresponds to a data record $x_i$. The number of attributes forms the dimension d. There now exists a comprehensive historical product database in which all attributes (measured values) of the products are stored together with the information on their quality class ("acceptable", "defective") ($y_i$). Here, $y_i$=1 is to signify the quality class "Acceptable" and $y_i$=−1 is to signify the quality class "Defective". The aim now is to use the product database to construct a classifier $f$ which permits the quality class of each new product to be predicted in online operation with the aid of the measured values of the product. Products classified as "Defective" are automatically selected for manual quality control.

A classification task is involved here. A device 1 for generating a classifier for the quality of the products is illustrated schematically in FIG. 1. Historical data must be present before a classifier can be generated. For this purpose, the data occurring in the production process 10 are acquired electronically by means of measurement sensors 20. This process can take place independently of the automatic generation of the classifier at an earlier point in time. The acquired data can be further preprocessed by means of a signal preprocessing device 30 by virtue of the fact that the signals are, for example, normalized or subjected to special transformations, for example Fourier or wavelet transformations, and possibly smoothed. Thereafter, the measured data are preferably stored in tabular form with the product attributes as columns and the products as rows. The storage of the acquired/processed (historical) data is performed in a database, or simply in a file 40, such that an electronic training set is present.

With the aid of an access device 50, the data of the product table are entered by the processor of an arithmetic unit 60, which is equipped with a memory and with the classification software on the basis of the sparse-grid technique. The classification software calculates a functional relationship (classifier) between the product attributes and the quality class(es). The classifier 80 can be visualized graphically by means of the output device 70, sent to online classification or stored in a database/file 90, it is possible in the case of a database for the database 90 to be identical to the database 40.

The use of conventional classification methods encounters two difficulties in the case of automatic generation of the classifier:

(i) Classical classification methods cannot be applied to the overall data volume because of the large number of products in the historical product database (frequently a few ten thousands to a few millions). Consequently, the classifier $f_c$ can be designed only on the basis of a small sample element, which is generated, for example, with the aid of a random number generator, and it is of lesser quality.

(ii) The classifier $f_c$ designed by conventional methods is time-consuming in the online classification, and this leads in online use to output problems, in particular to time delays in the industrial process to be optimized.

Figure 2:
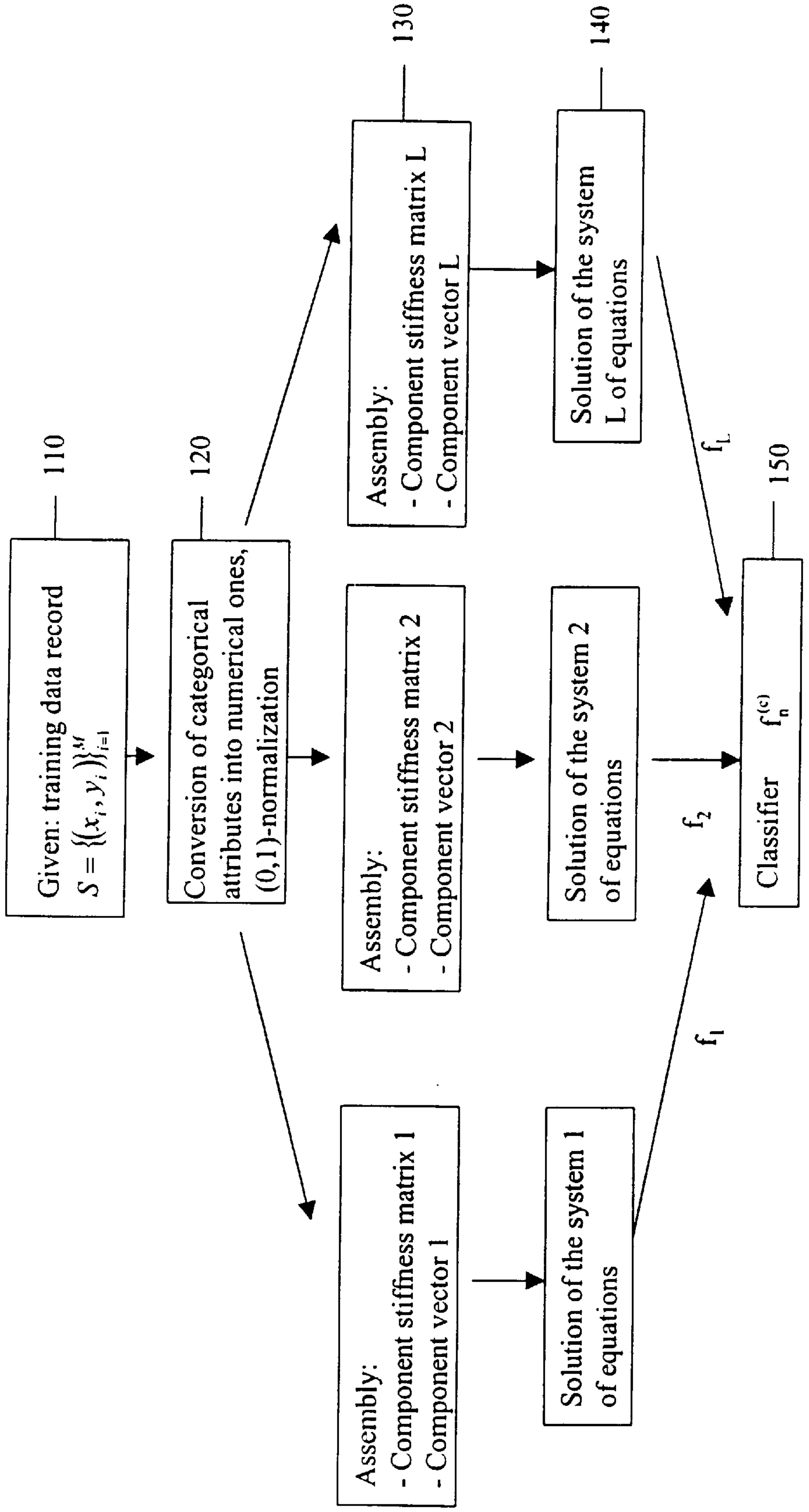
FIG. 2 shows a schematic block diagram for explaining a method for automatically generating a classifier by means of sparse grid technology.

The application of the sparse-grid method solves both problems. The cycle of a sparse-grid classification is illustrated schematically in FIG. 2. The method is explained below with the aid of an example. At the start of classification, the product attributes are present together with the quality class for all products of the historical product database as a training data record 110. In a following step 120, all categorical product attributes, that is to say all attributes without a defined metric such as, for example, the product colour, are transformed into numerical attributes, that is to say attributes with a metric. This can be performed, for example, by allocating a number for each attribute characteristic value or conversion into a block of binary attributes. Thereafter, all attributes are transformed by means of an affine-linear mapping onto the value range [0,1], in order to render them numerically comparable.

Applying the combination method of the sparse-grid technique, in step 130 the stiffness matrix and the load vector of the discretized system (13) are assembled for each of the L subgrids of the combination method. In this case, the discretization level n is prescribed by the user so as to ensure adequate complexity of the classifier function. Since the number L of the systems (13) of equations together with their dimension is a function only of the discretization level n (and the number of the attributes d), and does not depend on the number of data points (products), the systems (13) of equations can also be set up (and solved) for a very large number of products in a short time. The resulting L systems (13) of equations are solved in step 140 for each subgrid of the combination method by means of iteration methods, generally a preconditioned method of the conjugate gradient. The coefficients $\alpha_1$ define the subclassifier functions $f_1$ over the individual grids, the linear combination thereof producing the overall classifier $f_n(^c)$. The latter is therefore present in step 150 over the coefficients $\alpha_1$. The classifier $f_n(^c)$ describes the relationship between the measured values and the quality class of the inspected products. The higher the function value of the classifier function, the better the quality of the product, and the lower its value, the worse. The classifier therefore permits not only assignment to one of the two quality classes "Acceptable", "Defective", but even a graded sorting with reference to the quality probability.

In the course of the online classification, the data of the production process are acquired by means of measuring sensors and preprocessed by means of the signal preprocessing device (compare 10–30 in FIG. 1). Thereafter, the data are freely directed to an arithmetic unit, which is equipped with a processor and a memory and can be identical to the arithmetic unit for automatic generation of the classifier, or be an arithmetic unit different therefrom, and which is equipped with the online classification software based on the sparse-grid technique. In order to simplify the representation, the arithmetic unit in FIG. 1 is used for automatic generation of the classifier and for online classification. It can, however, also be provided that the classifier is generated with the aid of a computing device, and that the classifier generated is then used on another computing device for the online classification. The arithmetic unit used for the online classification must have a suitable interface (not illustrated) for receiving the electronic product attributes data acquired with the aid of the measuring sensors.

On the basis of the measured product attributes, the arithmetic unit used within the scope of the online classification uses the sparse-grid classifier in conjunction with analysing means (not illustrated) to make a prediction of the quality class for the respective product, and assigns this electronically to the product, it being possible to visualize the quality class by means of an output device and/or to use it directly to initiate actions. Such an action can consist, for example, in that a product $\tilde{x}_i(f_n^{(c)}(\tilde{x}_i)<0)$ characterized as "Defective" is selected automatic and sent for manual appraisal. Moreover, depending on the grade of defectiveness (value of $f_n^{(c)}<0$), the sorting can be performed into various categories which, in turn, initiate different actions for investigating and removing the defect.

Figure 3:
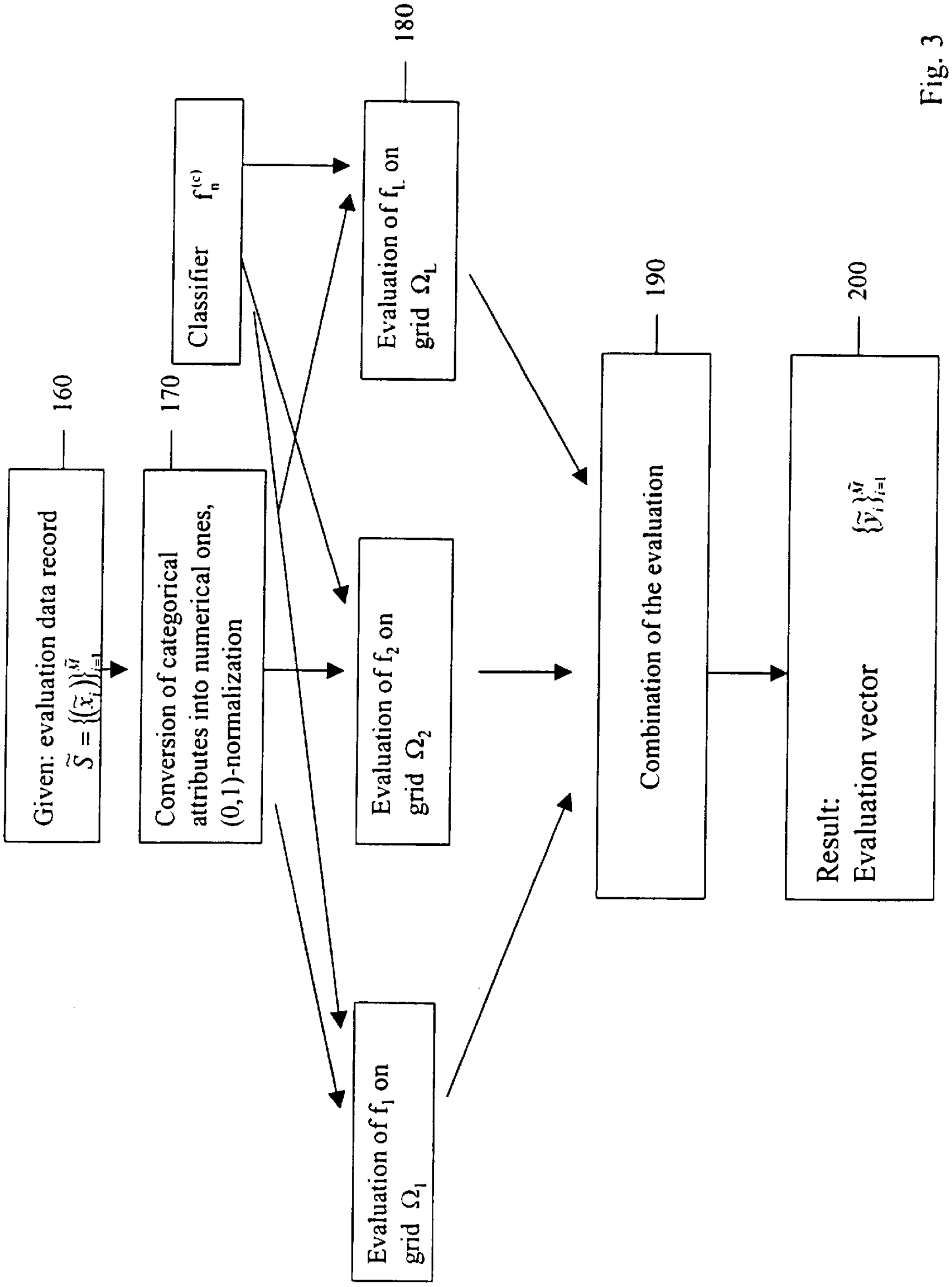
FIG. 3 shows a schematic block diagram for explaining a method for automatically applying an online classification.

The online classification by means of a sparse-grid method is illustrated schematically in FIG. 3. Each product is characterized by its measured and preprocessed attributes, and therefore corresponds to a data record $\tilde{x}_i$. The number of the attributes forms, in turn, the dimension d. It follows that, at the start of the online classification, the product attributes are present as an evaluation data record 160 for all products to be classified. The number of evaluation data is frequently only $\tilde{M}=1$ in this case, if the product present in the production process is to be classified immediately. At the same time, the classifier $f_n^{(c)}$ (over the coefficients $\alpha_l$ of all L subgrids) is entered from the memory or from a database/file by the online classification program. In step 170, all categorical attributes are then transformed into numerical ones, and thereafter a (0,1)-transformation of all attributes is undertaken. This step is performed with the same methods as in step 120. Thereafter, the individual subclassifiers $f_l$ of all L subgrids are applied to the evaluation data in step 180. The calculated function values are finally collected for all subgrids in step 190. As a result, there is present in step 200 a vector of the predicted quality classes $\tilde{y}_i$ for all $\tilde{M}$ evaluation data, which vector can be used for the above-described further processing. Since the number of coefficients $\alpha_l$ and of the subgrids L is independent of the number of training data records and is therefore relatively small, the online classification is performed very quickly, and this renders the described sparse-grid classification particularly suitable for quality monitoring in mass production.

The sparse-grid classification was described using the example of classification of manufactured products. However, for the person skilled in the art, it follows that the electronic data/attributes processed (classified) during the online classification can characterize any desired objects or events, and so the method and the device used for execution are not restricted to the application described here. Thus, the sparse-grid classification method may also be used, in particular, for automatically evaluating customer, financial and corporate data.

On the basis of the classification quality achieved and of the given speed, however, the described sparse-grid classification method is suitable for arbitrary applications of the classification. This is shown in the following example of two benchmarks.

Figure 6A:
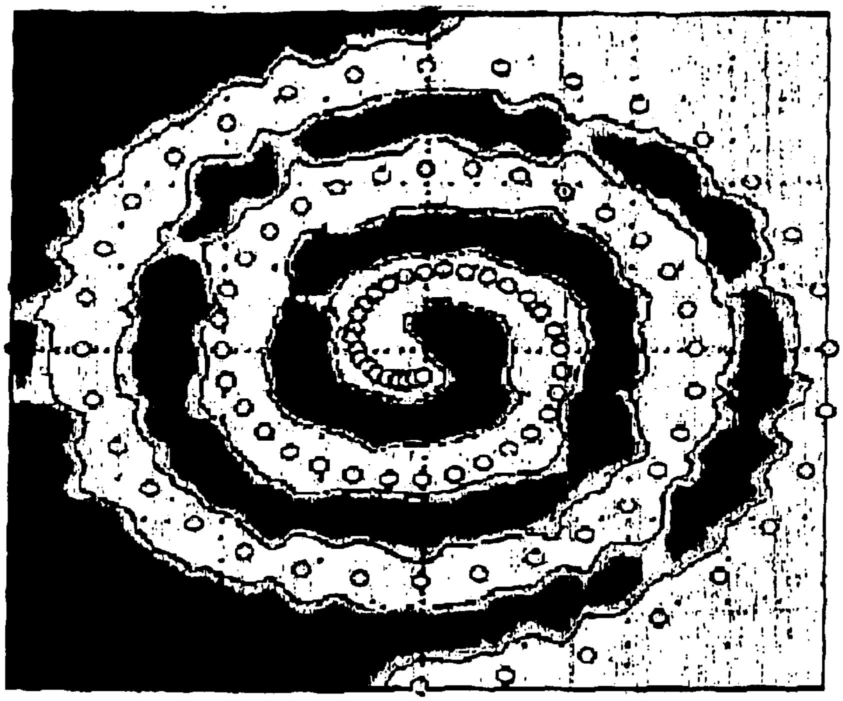
FIGS. 6A and 6B show a spiral data record with sparse grids for level 6 and level 8, respectively.

The first example is a spiral data record which has been proposed by A. Wieland of MITRE Corp. (compare E: Fahlmann, C. Lebiere, THE CASCADE-CORRELATION LEARNING ARCHITECTURE, Advances in Neural Information Processing Systems 2, Touretzky, ed., Morgan-Kaufmann, 1990). The data record is illustrated in FIG. 6A. In this case, 194 data points describe two interwoven spirals; the number of attributes d is 2. It is known that neural networks frequently experience difficulties with this data record, and a few neural networks are not capable of separating the two spirals.

Figure 6B:
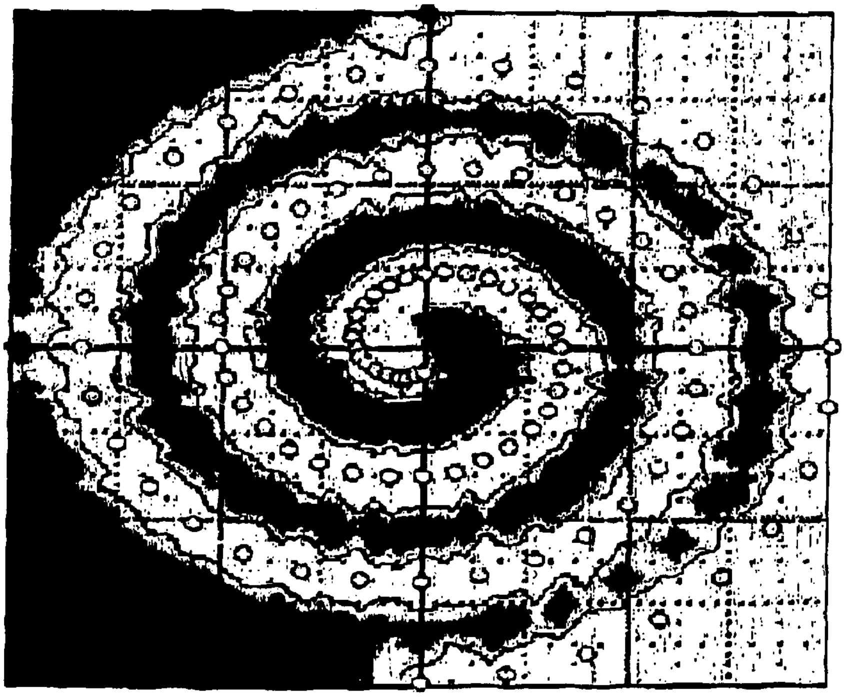

The result of the sparse-grid combination method is illustrated in FIGS. 6A and 6B for $\lambda$=0.001 and n=6 or n=8. Two spirals can be separated correctly as early as level 6 (compare FIG. 6A). Only 577 sparse-grid points are required in this case. For level 8 (compare FIG. 6B) sparse-grid points, the form of the two spirals becomes smoother and clearer.

A 10-dimensional test data record with 5 million data points as training data and 50 000 data points as evaluation data was generated as a second example for the purpose of measuring the output of the sparse-grid classification method, this being done with the aid of the data generator DatGen (compare G. Melli, DATGEN: A PROGRAMME THAT CREATES STRUCTURED DATA. Website, http://www.datasetgenerator.com). The call was datgen-r1X0/200, R,O:0/200,R,O:0/200,R,O:0/200,R,O:0/200,R,O:0/200,R, O:0/200,R,O:0/200,R,O:0/200, R,O:0/200,R,O:0/200,R,O:-R2-C2/6-D2/7-T10/60-O5050000-p -e0.15.

The results are illustrated in Table 1.

The measurements were carried out on a Pentium III 700 MHz machine. The highest storage requirement (for level 2 with 5 million data points) was 500 Mbytes. The value of the regularization parameter was $\lambda$=0.01.

The classification quality on the training and test set (in per cent) are shown in the third and fourth columns of Table 1. The last column contains the number of the iterations in the method of the conjugated gradient for the purpose of solving the systems of equations. The results are to be seen in the table below. The overall computing time scales in an approximately linear fashion and is moderate even for these gigantic data records.

TABLE 1

| Level | Number of data points | Training quality | Evaluation quality | Computing time (s) | Number of iterations |
|---|---|---|---|---|---|
| 1 | 50 000 | 98.8 | 97.2 | 19 | 47 |
| | 500 000 | 97.6 | 97.4 | 104 | 50 |
| | 5 million | 97.4 | 97.4 | 811 | 56 |
| 2 | 50 000 | 99.8 | 96.3 | 265 | 592 |
| | 500 000 | 98.6 | 97.8 | 1126 | 635 |
| | 5 million | 97.9 | 97.9 | 7764 | 688 |

The features of the invention disclosed in the above description, the drawing and the claims can be significant both individually and in any desired combination for the implementation of he invention in its various embodiment:

What is claimed is:

1. Device for generating a classifier for automatically sorting objects, which are respectively characterized by electronic attributes, in particular a classifier for automatically sorting manufactured products into up-to-standard products and defective products, having a storage device for storing a set of electronic training data, which comprises a respective electronic attribute set for training objects, and having a processor device for processing the electronic training data, a dimension (d) being determined by the number of attributes in the respective electronic attribute set, characterized in that the processor device has discretization means for automatically discretizing a function space (V), which is defined over the real numbers ($h_t=2^{-l_1}$), into subspaces ($V_N$, N=2, 3, . . . ) by means of a sparse grid technique and processing the electronic training data with the aid of a processor device.

2. Device according to claim 1, characterized in that the processor device has evaluation means for automatically evaluating the classifier generated during processing of the electronic training data, in order to apply the classifier to a set of electronic evaluation data such that quality of the classifier can be evaluated.

3. Device according to claim 1, characterized by interface means for coupling an input device for user inputs and/or for coupling a graphics output device.

4. Method for generating a classifier for automatically sorting objects, which are respectively characterized by electronic attributes, in particular a classifier for automatically sorting manufactured products into up-to-standard products and defective products, the method having the following steps:

transmitting a set of electronic training data, which comprises a respective electronic attribute set for training objects, from a storage device to a processor device, dimension (d) being determined by the number of attributes in the respective electronic attribute set;

processing the electronic training data in the processor device, a function space (V) defined over $R^d$ being electronically discretized into subspaces ($V_N$, N=2, 3, . . . ) with the aid of discretization means with the use of a sparse grid technique;

forming the classifier as a function of the processing of the electronic training data in the processor device; and electronically storing the classifier formed.

5. Method according to claim 4, characterized in that the classifier formed for evaluating the quality of the classifier is automatically applied to a set of electronic evaluation data in order to form quality parameters which are indicative of the quality of the classifier.

6. Method according to claim 4, characterized in that a combination method of the sparse grid technique is applied for the electronic discretization of the function space (V).

7. Device for online sorting of objects which are characterized by respective electronic attributes, in particular of manufactured products into up-to-standard products and defective products with the aid of an electronic classifier generated using the sparse grid technique, the device having:

Reception means for receiving characteristic features of the objects to be sorted in the form of electronic attributes; and A processor device with:

Analysing means for online analysis of the electronic attributes with the aid of the classifier; and Assignment means for electronically assigning the objects to be sorted to one of a plurality of sorting classes as a function of the automatic online analysis.

8. Method for online sorting of objects which are characterized by respective electronic attributes, in particular manufactured products into up-to-standard products and defective products by means of an electronic classifier generated using the sparse grid technique, the method having the following steps:

Online detection of characteristic features, that are the form of electronic attributes, of the objects to be sorted;

Automatic online analysis of the electronic attributes using the classifier with the aid of a processor device; and Assignment of the objects to be sorted to one of a plurality of sorting classes as a function of the automatic online analysis.

9. Device for executing a data mining method by generating a classifier for automatically sorting objects, which are respectively characterized by electronic attributes, in particular a classifier for automatically sorting manufactured products into up-to-standard products and defective products, having a storage device for storing a set of electronic training data, which comprises a respective electronic attribute set for training objects, and having a processor device for processing the electronic training data, a dimension (d) being determined by the number of attributes in the respective electronic attribute set, characterized in that the processor device has discretization means for automatically discretizing a function space (V), which is defined over the real numbers $R^d$, into subspaces ($V_N$, N=2, 3, . . . ) by means of a sparse grid technique and processing the electronic training data with the aid of a processor device.

10. Method for data mining by generating a classifier for automatically sorting objects, which are respectively characterized by electronic attributes, in particular a classifier for automatically sorting manufactured products into up-to-standard products and defective products, the method having the following steps:

transmitting a set of electronic training data, which comprises a respective electronic attribute set for training objects, from a storage device to a processor device, dimension (d) being determined by the number of attributes in the respective electronic attribute set;

processing the electronic training data in the processor device, a function space (V) defined over $R^d$ being electronically discretized into subspaces ($V_N$,N=2, 3, . . . ) with the aid of discretization means with the use of a sparse grid technique;

forming the classifier as a function of the processing of the electronic training data in the processor device; and electronically storing the classifier formed.

* * * * *

UNITED STATES PATENT AND TRADEMARK OFFICE

CERTIFICATE OF CORRECTION

PATENT NO. : 6,757,584 B2
DATED : June 29, 2004
INVENTOR(S) : Michael Thess et al.

It is certified that error appears in the above-identified patent and that said Letters Patent is hereby corrected as shown below:

Column 11,
Line 32, please replace "$(h_t=2^{-l})$" with -- $\Re^d$ --.

Signed and Sealed this

Fifth Day of October, 2004

JON W. DUDAS
*Director of the United States Patent and Trademark Office*